US012098822B2

(12) United States Patent
Liao et al.

(10) Patent No.: US 12,098,822 B2
(45) Date of Patent: Sep. 24, 2024

(54) LIGHT BOX STRUCTURE

(71) Applicant: AUO Corporation, Hsin-Chu (TW)

(72) Inventors: Li-Yuan Liao, Hsin-Chu (TW); Chien-Hsin Lin, Hsin-Chu (TW); Ming-Chun Hsu, Hsin-Chu (TW); Yu-Chin Wu, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 112 days.

(21) Appl. No.: 18/091,511

(22) Filed: Dec. 30, 2022

(65) Prior Publication Data

US 2023/0341111 A1 Oct. 26, 2023

(30) Foreign Application Priority Data

Apr. 20, 2022 (TW) .................................. 111115115

(51) Int. Cl.

| | |
|---|---|
| ***F21V 17/10*** | (2006.01) |
| ***F21V 17/02*** | (2006.01) |
| ***F21V 17/12*** | (2006.01) |
| ***F21V 21/096*** | (2006.01) |
| ***F21V 21/14*** | (2006.01) |

(52) U.S. Cl.

CPC ............ *F21V 17/105* (2013.01); *F21V 17/02* (2013.01); *F21V 17/12* (2013.01); *F21V 21/096* (2013.01); *F21V 21/14* (2013.01)

(58) Field of Classification Search

CPC ........ F21V 17/105; F21V 17/12; F21V 21/14; F21V 21/108; F21V 21/22; F21V 14/02; F21S 2/005; F21Y 2107/10; F21Y 2107/20; F21Y 2107/30; G09F 9/37; G09F 9/375; G09F 9/302; G09F 9/3026

See application file for complete search history.

(56) References Cited

U.S. PATENT DOCUMENTS

| | | | | |
|---|---|---|---|---|
| 3,917,940 | A * | 11/1975 | Duddy | F21S 6/003 362/398 |
| 3,947,984 | A * | 4/1976 | Winrow | G09F 9/375 439/85 |
| 5,463,827 | A * | 11/1995 | Williams | G09F 9/375 40/449 |
| 9,279,573 | B1 * | 3/2016 | Perez-Bravo | G09F 9/301 |
| 2010/0157594 | A1 * | 6/2010 | Yang | F21K 9/23 362/249.02 |
| 2010/0207945 | A1 * | 8/2010 | Kirsch | G09F 9/37 345/428 |

(Continued)

FOREIGN PATENT DOCUMENTS

| | | |
|---|---|---|
| CN | 106548726 A | 3/2017 |
| CN | 110689821 A | 1/2020 |

(Continued)

*Primary Examiner* — Peggy A Neils
*Assistant Examiner* — James M Endo
(74) *Attorney, Agent, or Firm* — Tim Tingkang Xia, Esq.; Locke Lord LLP

(57) ABSTRACT

A light box structure includes a bracket and a board. The bracket is in an arc shape and has a first surface and a second surface opposite to each other. The board has a plurality of magnetic positioning posts. The magnetic positioning posts have at least two different heights. The board is attracted and attached on the first surface of the bracket through the magnetic positioning posts.

12 Claims, 5 Drawing Sheets

(56) References Cited

U.S. PATENT DOCUMENTS

| | | | | |
|---|---|---|---|---|
| 2016/0035310 | A1* | 2/2016 | Song | G06F 3/017 345/156 |
| 2016/0195770 | A1* | 7/2016 | Fukai | G02F 1/133606 362/311.01 |
| 2017/0092404 | A1 | 3/2017 | Sai et al. | |
| 2019/0333424 | A1* | 10/2019 | Zhu | G09F 9/33 |
| 2020/0220041 | A1* | 7/2020 | Kim | H01L 33/0095 |
| 2020/0302836 | A1* | 9/2020 | Tan | G09F 13/22 |

FOREIGN PATENT DOCUMENTS

| | | | |
|---|---|---|---|
| CN | 111862845 | A | 10/2020 |
| CN | 213150226 | U | 5/2021 |
| TW | 201725959 | A | 7/2017 |

* cited by examiner

LIGHT BOX STRUCTURE

CROSS-REFERENCE TO RELATED PATENT APPLICATION

This non-provisional application claims priority to and the benefit of, pursuant to 35 U.S.C. § 119(a), patent application Serial No. 111115115 filed in Taiwan on Apr. 20, 2022. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to a light box structure, and particularly to a light box structure having an arc shape.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An existing light box, such as a ball-shaped light box, is generally formed by a plurality of light boards matched with a plurality of arc-shaped mechanisms, and due to the effects of material ductility and thermal variation during processing, it is difficult to implement a precise positioning mechanism. Further, the light boards assembly and splicing are performed through column-by-column splicing, without an effective positioning basis, such that it is easy to affect the viewing quality due to the issue of tolerance accumulation.

In addition, with the variety of shapes of the light box, it is required to use the light boards of different specifications and shapes for splicing. Thus, different light boards must be manufactured for different specifications thereof, resulting in issues of increased cost and time-consuming.

SUMMARY

In view of the foregoing issues, one embodiment provides a light box structure, which includes a bracket and a board. The bracket is in an arc shape and has a first surface and a second surface opposite to each other. The board has a plurality of magnetic positioning posts. The magnetic positioning posts have at least two different heights. The board is attracted and attached on the first surface of the bracket through the magnetic positioning posts.

In certain embodiments, each of the magnetic positioning posts comprises a base post and a magnetic adjusting member, the magnetic adjusting member is movably disposed on the base post and attracted and attached on the first surface, and the magnetic adjusting member is configured to adjust a height of each of the magnetic positioning posts.

In certain embodiments, each of the magnetic positioning posts comprises an elastic member, and the elastic member is disposed on a side of each of the magnetic positioning posts facing the first surface.

In certain embodiments, the magnetic adjusting member comprises an operating member, an elastic member and a magnetic member, the elastic member is disposed on the operating member, and the magnetic member is engaged in the elastic member.

In certain embodiments, the bracket has two slots corresponding disposed adjacent to each other, the board comprises two positioning posts corresponding disposed adjacent to each other, and the two positioning posts are correspondingly disposed in the two slots.

In certain embodiments, a slot length of each of the two slots extending along a long edge direction of the bracket is greater than a slot width thereof.

In certain embodiments, the slot length of each of the two slots is 15 to 20 mm, and the slot width of each of the two slots is 8 mm.

In certain embodiments, each of the two positioning posts comprises a post having a screw hole and a screw member, the screw hole is disposed on a side of the post away from the board, and the screw member passes through a corresponding one of the two slots corresponding to each of the two positioning posts from the second surface of the bracket, and is screwed in the screw hole of each of the two positioning posts.

In certain embodiments, each of the two positioning posts comprises a post having a screw hole and a positioning pin, the positioning pin comprises a screw locking portion, a stopping portion and a positioning portion, the stopping portion is located between the screw locking portion and the positioning portion, the positioning pin is movably disposed on the post, such that the screw locking portion is movably screwed and locked in the screw hole, the positioning portion passes through a corresponding one of the two slots, and the stopping portion is attracted and attached on the first surface.

In sum, one embodiment provides a light box structure. By disposing the magnetic positioning posts with different heights on the board, once the board is attached and attached on the bracket, the board may bend corresponding to the shape of the bracket, and the different heights of the magnetic positioning posts may be used to adjust the tolerance thereof, thus forming the final shape required. With the arrangement of multiple boards, the illuminated surface of the light box is arc-shaped. Further, through the magnetic positioning posts, the board may be detached or assembled conveniently and rapidly, thus achieving maintenance and adjustment conveniently.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
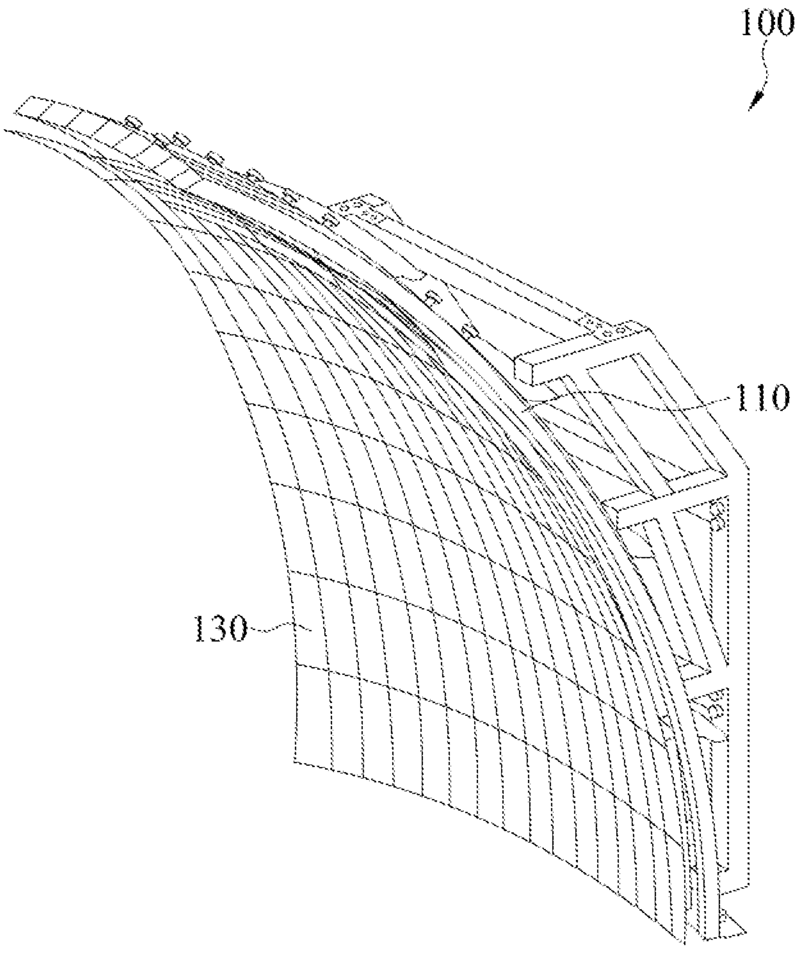
FIG. 1 is a perspective view of a light box structure according to a first embodiment of the present disclosure.
Figure 2:
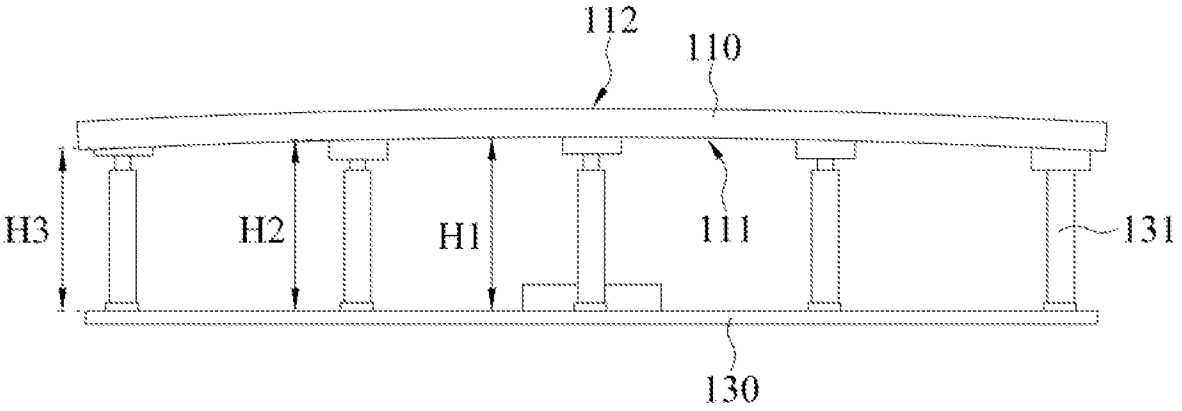
FIG. 2 is a partial front view of a light box structure according to a first embodiment of the present disclosure.

Referring to FIG. 1 and FIG. 2, FIG. 1 is a perspective view of a light box structure according to a first embodiment of the present disclosure. FIG. 2 is a partial front view of a light box structure according to a first embodiment of the present disclosure. The light box structure 100 includes a bracket 110 and a board 130. In the first embodiment, the light box structure 100 is, for example, an arc-shaped light box, which presents an arc-shaped illuminated surface by assembling a plurality of boards 130 on the bracket 110.

As shown in FIG. 2, the bracket 110 is in an arc shape, and has a first surface 111 and a second surface 112 opposite to each other. In the first embodiment, the bracket 110 is a bracket set 110 formed by a plurality of single bracket strips. Since the boards 130 are spliced column-by-column on the bracket 110, the description hereinafter relates only to a portion of the bracket 110 and a single board 130. A conventional light box structure is a sphere spliced by multi-dimensional continued surfaces, which correspondingly require splicing of a plurality of boxes formed by die casting with different specifications. However, the size thereof such as the curvature, etc. must be effectively controlled through processing, which is not in line with the cost. In the first embodiment, a plurality of boards 130 are assembled on the arc-shaped bracket 110, such that the illuminated surface of the light box structure 100 is arc-shaped, and the required curvature thereof may be adjusted simultaneously during the assembly to absorb the tolerance, thus having the advantages of simplification of the mechanical parts without the need for high cost manufacturing the boards 130 of different shapes, and the cost thereof is more advantageous.

In the first embodiment, as shown in FIG. 2, the board 130 has a plurality of magnetic positioning posts 131. The magnetic positioning posts 131 have at least two different heights H1, H2, H3, and the board 130 is attracted and attached on the first surface 111 of the bracket 110 through the magnetic positioning posts 131. In the first embodiment, each magnetic positioning post 131 has a different height to be correspondingly attracted and attached on the bracket 110, without being limited thereto. Each magnetic positioning post 131 may be, for example, a positioning post with an adjustable height, with the same height. The magnetic positioning posts 131 are designed to have different heights to correspond to the arc-shaped bracket 110, and the corresponding structures of the positioning post with the adjustable height will be described in details later.

Specifically, in the first embodiment, the magnetic positioning posts 131 with different heights are used to attract and attach the board 130 on the bracket 110, and the arrangement of the boards 130 allows the illuminated surface of the light box to be arc-shaped. Further, through the magnetic positioning posts 131, the board 130 may be detached or assembled conveniently and rapidly, thus achieving maintenance and adjustment conveniently.

Figure 3:
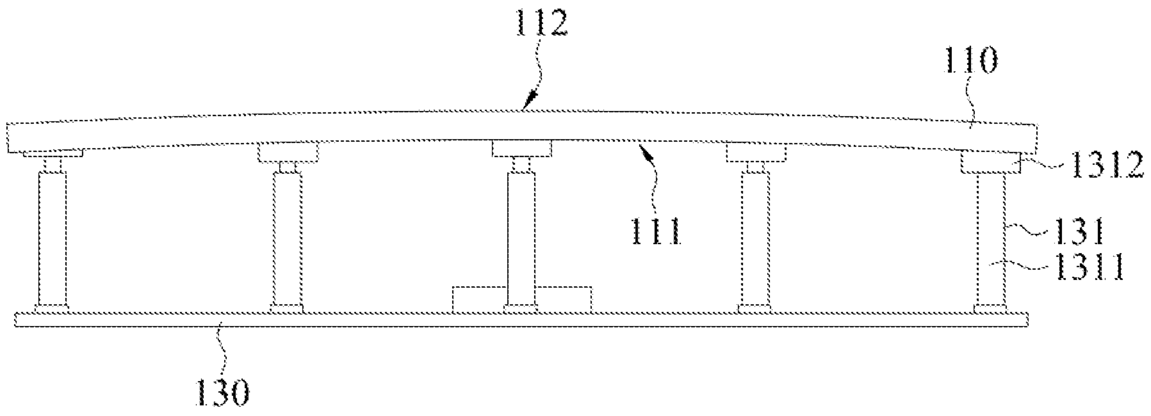
FIG. 3 is a partial front view of a light box structure according to a second embodiment of the present disclosure.

Referring to FIG. 3, FIG. 3 is a partial front view of a light box structure according to a second embodiment of the present disclosure. The structures of the second embodiment similar to those of the first embodiment are not further elaborated. Regarding the positioning post with the adjustable height, in the second embodiment, each of the magnetic positioning posts 131 includes a base post 1311 and a magnetic adjusting member 1312. The magnetic adjusting member 1312 is movably disposed on the base post 1311 and attracted and attached on the first surface 111, and the magnetic adjusting member 1312 is configured to adjust a height of the whole corresponding magnetic positioning post 131. In the second embodiment, the base post 1311 of each magnetic positioning post 131 has the same height. The base post 1311 is, for example, a post having a screw hole, the magnetic adjusting member 1312 is disposed on the base post 1311 by screwing and locking, and the corresponding arc height of each magnetic positioning post 131 is adjusted by rotating the magnetic adjusting member 1312. Through the operable magnetic adjusting member 1312, a single magnetic positioning post 131 may be suited to multiple different positions, without the need to manufacture magnetic positioning posts for different heights, thus simplifying the material complexity thereof. In the second embodiments, the magnetic adjusting member 131 may be, for example, further disposed with a magnet inside thereof, such that the board 130 and the bracket 110 may be attracted and attached through the arc, thus absorbing the corresponding manufacturing and assembly tolerances. Corresponding screw structures exist between the magnetic adjusting member 1312 and the base post 1311, and the accumulative tolerance may be absorbed by adjusting the magnetic adjusting member 1312.

Further, the heights of the magnetic positioning posts 131 allow a user in the in-site assembly occasion to view the boards 130 and simultaneously perform adjustment based on the operation and adjustment status. For example, the overall heights of the magnetic positioning posts 131 may be, for example, 20 mm to 25 mm, thus preserving sufficient space for the fingers of the user to pass therethrough in order to adjust the magnetic adjusting member 1312, and adjusting the board 130 through the magnetic adjusting member 1312. Further, the height adjusting range of the magnetic adjusting member 1312 is 1 mm to 5 mm. Thus, the user does not need to detach and assembly the boards 130 repeatedly, thereby achieving an effective three-dimensional axial light board splicing and adjustment.

Figure 4:
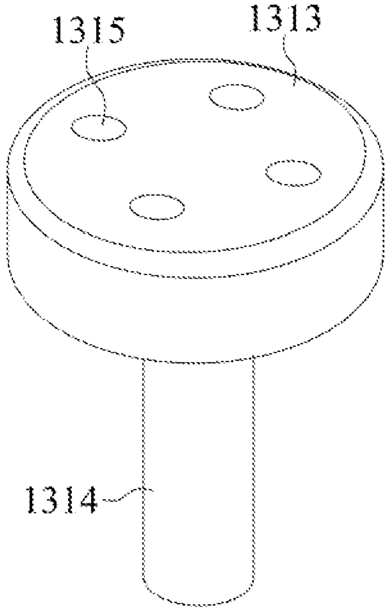
FIG. 4 is a perspective view of a magnetic adjusting member according to a third embodiment of the present disclosure.

Referring to FIG. 4, FIG. 4 is a perspective view of a magnetic adjusting member according to a third embodiment of the present disclosure. The structures of the third embodiment similar to those of the second embodiment are not further elaborated. Referring to FIG. 3 and FIG. 4, in the third embodiment, an end of the magnetic adjusting member 1312 of each magnetic positioning post 131 is a magnetic material, which may directly attract and attach the magnet into a corresponding groove. To allow the board 130 to arc-fit on the bracket 110, the magnetic adjusting member 1312 further includes an elastic member 1313. The elastic member 1313 is disposed at an outer side of the magnet, which is a side of the magnetic positioning post 131 facing the first surface 111. For example, the elastic member 1313 is disposed on a surface of the magnetic adjusting member 1312 being attracted and attached on the first surface 111. That is, the elastic member 1313 is located between the first surface 111 and the magnetic adjusting member 1312. Thus, the elasticity of the elastic member 1313 absorbs the tolerance manufactured by the arc-shaped curve surface of the bracket 110, such that the magnetic adjusting member 1312 is more attached on the first surface 111. The elastic member 1313 may be a sponge or rubber, or an elastic material or object.

As shown in FIG. 4, in the third embodiment, the magnetic adjusting member 1312 includes an operating member 1314 and a magnetic member 1315, where the elastic member 1313 is disposed on the operating member 1314, and the magnetic member 1315 is engaged in the elastic member 1313. For example, an end of the magnetic adjusting member 1312 is a magnetic material, which may directly attract and attach the magnetic member 1315 into a corresponding groove of the corresponding magnetic adjusting member 1312, and the elastic member 1313 is disposed at an outer edge side of the magnetic member 1315. The corresponding height of each magnetic positioning post 131 is adjusted by rotating the operating member 1314, such that the magnetic adjusting member 1312 moves relative to the base post 1311. In the third embodiment, the magnetic member 1315 is engaged in the elastic member 1313 to be attracted and attached on the first surface 111, without being limited thereto. The magnetic adjusting member 1312 may be itself magnetic, or the magnetic member 1315 may be engaged in the operating member 1314.

Figure 5:
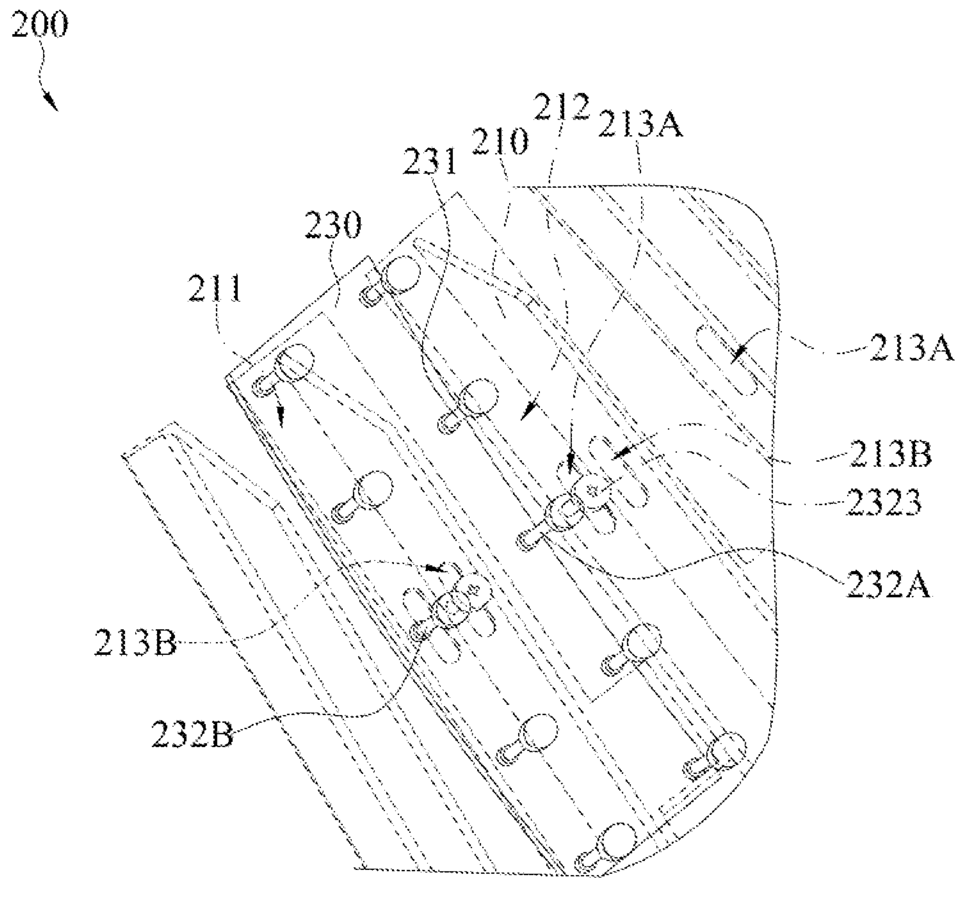
FIG. 5 is a perspective view of a light box structure according to a fourth embodiment of the present disclosure.
Figure 6:
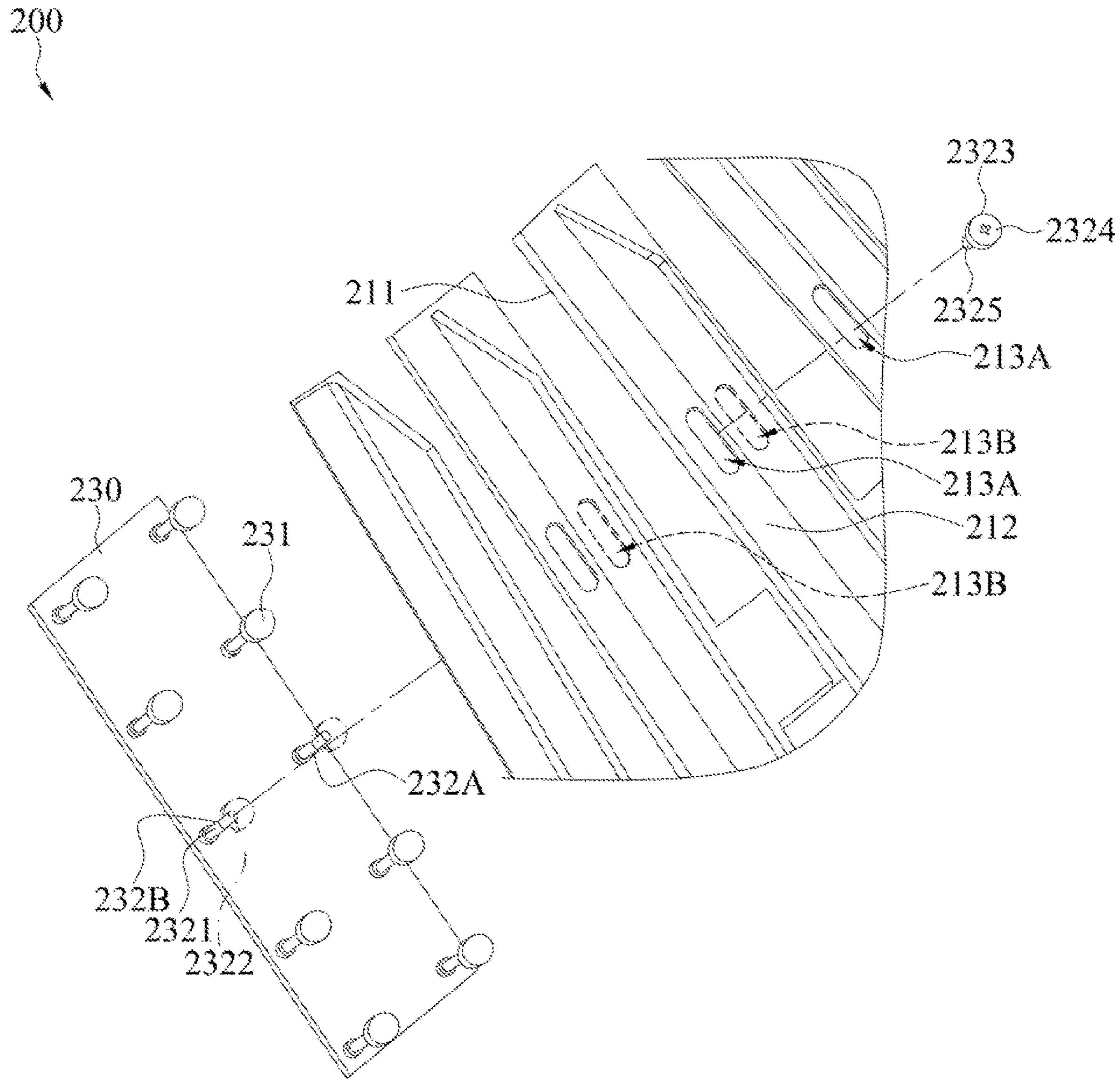
FIG. 6 is a disassembled view of a light box structure according to a fourth embodiment of the present disclosure.

Referring to FIG. 5 and FIG. 6, FIG. 5 is a perspective view of a light box structure according to a fourth embodiment of the present disclosure. FIG. 6 is a disassembled view of a light box structure according to a fourth embodiment of the present disclosure. FIG. 5 is viewed from the bracket 210 side toward the board 230 side, and shows the bracket 210 in a perspective method with center lines, thus viewing the assembly relationship between the board 230 and the bracket 210. In the fourth embodiment, the bracket 210 of the light box structure 200 has two slots 213A, 213B corresponding disposed adjacent to each other, the board 230 includes two positioning posts 232A, 232B corresponding disposed adjacent to each other, and the two positioning posts 232A, 232B are correspondingly disposed in the two slots 213A, 213B. The board 230 may be positioned through the two positioning posts 232A, 232B being correspondingly disposed in the two slots 213A, 213B, and then attracted and attached to the first surface 211 of the bracket 210 through each magnetic positioning post 231. Thus, the board 230 may be assembled to the bracket 210 more accurately and rapidly.

In the fourth embodiment, a slot length of each slot 213A, 213B extending along a long edge direction of the bracket 210 is greater than a slot width thereof. Thus, through the pre-reserved space, the positioning posts 232A, 232B has a tolerance in the long edge direction to be adjustable and movable. For the board 230 with a longer shape or a long strip assembled by multiple boards 230, issues of the accumulative tolerance that causes the curved surface not to be beautiful or the difficulty for assembly and adjustment may be prevented. The slot length of each slot 213A, 213B may be, for example, 15 to 20 mm, and the slot width of each slot 213A, 213B may be, for example, 8 mm.

As shown in FIG. 5 and FIG. 6, in the fourth embodiment, each positioning post 232A, 232B includes a post 2321 having a screw hole 2322 and a screw member 2323. The screw hole 2322 is disposed on a side of the post 2321 away from the board 230. The screw member 2323 passes through a corresponding one of the slots 213A, 231B corresponding to the positioning posts 232A, 232B from the second surface 212 of the bracket 210, and is screwed in the screw hole 2322 of the positioning posts 232A, 232B. In the fourth embodiment, the bracket 210 is a bracket set 210 formed by a plurality of single bracket strips. Since the boards 230 are spliced column-by-column on the bracket 210, the description hereinafter relates only to a portion of the bracket 210 and a single board 230. However, as shown in FIG. 5, the bracket has a plurality of slots 213A, 231B for assembling multiple boards 230. In the fourth embodiment, the positioning post 232A and the positioning post 232B have identical structures, and the positioning post 232A are used for description purposes. As shown in FIG. 5 and FIG. 6, the screw member 2323 is a screw, and the screw head 2324 of the screw member 2323 abuts the second surface 212, and the screw thread 2325 thereof passes through the slot 213A to be screwed and locked in the screw hole 2322 of the post 2321. Thus, a distance between the post 2321 and the first surface 211 may be changed by rotating the screw member 2323. In addition, the position of the board 230 may be adjusted and the position restraint thereof may be performed along the long edge direction of the slot 213A.

Figure 7:
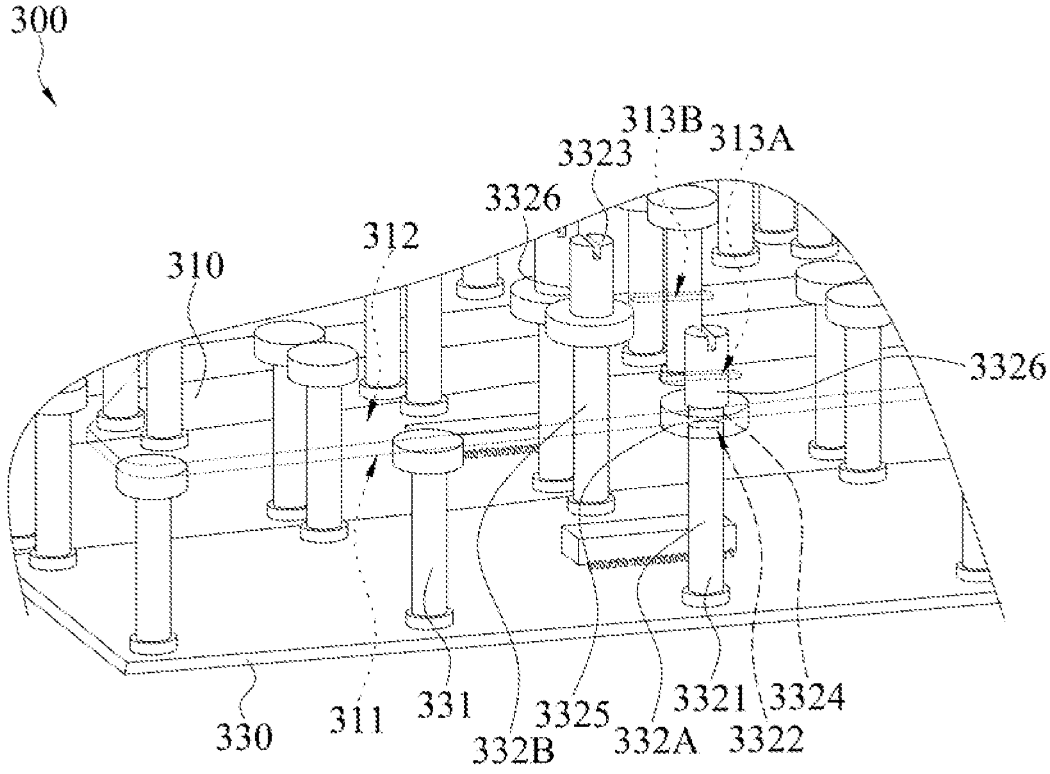
FIG. 7 is a perspective view of a light box structure according to a fifth embodiment of the present disclosure.

Referring to FIG. 7, FIG. 7 is a perspective view of a light box structure according to a fifth embodiment of the present disclosure. The structures of the fifth embodiment similar to those of the fourth embodiment are not further elaborated. In the fifth embodiment, the positioning posts 332A, 332B of the light box structure 300 have different structures from those of the fourth embodiment. Each positioning post 332A, 332B of the board 330 includes a post 3321 having a screw hole 3322 and a positioning pin 3323. The positioning pin 3323 is provided with screws corresponding to the screw hole 3322 of the post 3321 to be assembled altogether. The positioning pin 3323 includes a screw locking portion 3324, a stopping portion 3325 and a positioning portion 3326. The stopping portion 3325 is located between the screw locking portion 3324 and the positioning portion 3326. The positioning pin 3323 is movably disposed on the post 3321, such that the screw locking portion 3324 is movably screwed and locked in the screw hole 3322, the positioning portion 3326 passes through a corresponding one of the slots 313A, 313B, and the stopping portion 3325 may simultaneously utilize its material characteristics to be attracted, and is thus attracted and attached on the first surface 311. Thus, the board 330 may be attracted and attached on the first surface 311 of the bracket 310 through the magnetic positioning posts 331, and may restrain the positioning pin 3323 through the slots 313A, 313B, such that the positioning posts 332A, 332B may perform positioning.

The positioning post 332A and the positioning post 332B have identical structures, and the positioning post 332A are used for description purposes. As shown in FIG. 7, the screw portion 3324 of the positioning pin 3323 is screwed in the screw hole 3322 of the post 3321, and the positioning pin 3323 passes through the slot 313A from the first surface 311 side, and then the stopping portion 3325 at the first surface 311 side is attracted and attached on the first surface 311. Thus, the distance between the post 3321 and the first surface 311 may be changed by rotating the positioning portion 3326 at the second surface 312 side. Further, the position of the board 330 may be adjusted along the long edge direction of the slot 313A. Moreover, the stopping portion 3325 may be utilized with its material magnetic characteristics to be effectively attracted and attached on the first surface 311. Thus, the assembly and detaching directions are consistent, thus enhancing the assembly efficiency.

In sum, in the light box structure 100 according to the first, second and third embodiments, through the magnetic positioning posts 131 with different heights, the boards 130 are attached and attached on the bracket 110, and with the arrangement of the boards 130, the illuminated surface of the light box is arc-shaped. Further, through the magnetic positioning posts 131, the boards 130 may be detached or assembled conveniently and rapidly, thus achieving maintenance and adjustment conveniently. Moreover, it is possible to provide the magnetic positioning posts 131 with the same height, and the height of each magnetic positioning post 131 is adjusted through the magnetic adjusting member 1312. Further, the heights of the magnetic positioning posts 131 allow a user in the in-site assembly occasion to view the boards 130 and simultaneously perform adjustment based on the operation and adjustment status. Thus, the user does not need to detach and assembly the boards 130 repeatedly, thereby achieving an effective three-dimensional axial light board splicing and adjustment. In addition, in the light box structures 200, 300 according to the fourth and fifth embodiments, the board 230, 330 may be positioned to the slots 213A, 213B, 313A, 313B through the two positioning posts 232A, 232B, 332A, 332B, and then attracted and attached on the first surface 211, 311 by each magnetic positioning post 231, 331. Thus, the board 230, 330 may be assembled to the bracket 210, 310 more accurately and rapidly.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A light box structure, comprising:

a bracket, in an arc shape, wherein the bracket has a first surface and a second surface opposite to each other; and a board, having a plurality of magnetic positioning posts, wherein the magnetic positioning posts have at least two different heights, and the board is attracted and attached on the first surface of the bracket through the magnetic positioning posts;

wherein each of the magnetic positioning posts comprises a base post and a magnetic adjusting member, the magnetic adjusting member is movably disposed on the base post and attracted and attached on the first surface, and the magnetic adjusting member is configured to adjust a height of each of the magnetic positioning posts.

2. The light box structure according to claim 1, wherein each of the magnetic positioning posts comprises an elastic member, and the elastic member is disposed on a side of each of the magnetic positioning posts facing the first surface.

3. The light box structure according to claim 1, wherein the magnetic adjusting member comprises an operating member, an elastic member and a magnetic member, the elastic member is disposed on the operating member, and the magnetic member is engaged in the elastic member.

4. The light box structure according to claim 1, wherein the bracket has two slots corresponding disposed adjacent to each other, the board comprises two positioning posts corresponding disposed adjacent to each other, and the two positioning posts are correspondingly disposed in the two slots.

5. The light box structure according to claim 4, wherein each of the two positioning posts comprises a post having a screw hole and a screw member, the screw hole is disposed on a side of the post away from the board, and the screw member passes through a corresponding one of the two slots corresponding to each of the two positioning posts from the second surface of the bracket, and is screwed in the screw hole of each of the two positioning posts.

6. The light box structure according to claim 4, wherein each of the two positioning posts comprises a post having a screw hole and a positioning pin, the positioning pin comprises a screw locking portion, a stopping portion and a positioning portion, the stopping portion is located between the screw locking portion and the positioning portion, the positioning pin is movably disposed on the post, such that the screw locking portion is movably screwed and locked in the screw hole, the positioning portion passes through a corresponding one of the two slots, and the stopping portion is attracted and attached on the first surface.

7. The light box structure according to claim 4, wherein a slot length of each of the two slots extending along a long edge direction of the bracket is greater than a slot width thereof.

8. The light box structure according to claim 7, wherein each of the two positioning posts comprises a post having a screw hole and a screw member, the screw hole is disposed on a side of the post away from the board, and the screw member passes through a corresponding one of the two slots corresponding to each of the two positioning posts from the second surface of the bracket, and is screwed in the screw hole of each of the two positioning posts.

9. The light box structure according to claim 7, wherein each of the two positioning posts comprises a post having a screw hole and a positioning pin, the positioning pin comprises a screw locking portion, a stopping portion and a positioning portion, the stopping portion is located between the screw locking portion and the positioning portion, the positioning pin is movably disposed on the post, such that the screw locking portion is movably screwed and locked in the screw hole, the positioning portion passes through a corresponding one of the two slots, and the stopping portion is attracted and attached on the first surface.

10. The light box structure according to claim 7, wherein the slot length of each of the two slots is 15 to 20 mm, and the slot width of each of the two slots is 8 mm.

11. The light box structure according to claim 10, wherein each of the two positioning posts comprises a post having a screw hole and a screw member, the screw hole is disposed on a side of the post away from the board, and the screw member passes through a corresponding one of the two slots corresponding to each of the two positioning posts from the second surface of the bracket, and is screwed in the screw hole of each of the two positioning posts.

12. The light box structure according to claim 10, wherein each of the two positioning posts comprises a post having a screw hole and a positioning pin, the positioning pin comprises a screw locking portion, a stopping portion and a positioning portion, the stopping portion is located between the screw locking portion and the positioning portion, the positioning pin is movably disposed on the post, such that the screw locking portion is movably screwed and locked in the screw hole, the positioning portion passes through a corresponding one of the two slots, and the stopping portion is attracted and attached on the first surface.

* * * * *